(12) United States Patent
Nakashima

(10) Patent No.: US 9,889,921 B2
(45) Date of Patent: Feb. 13, 2018

(54) AIRCRAFT INCLUDING SUPPORT FOR A FAIRING

(71) Applicant: MITSUBISHI AIRCRAFT CORPORATION, Aichi (JP)

(72) Inventor: Keiji Nakashima, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 357 days.

(21) Appl. No.: 14/828,969

(22) Filed: Aug. 18, 2015

(65) Prior Publication Data
US 2016/0068254 A1    Mar. 10, 2016

(30) Foreign Application Priority Data

Sep. 10, 2014    (JP) .................................. 2014-183897

(51) Int. Cl.
*B64C 3/14*    (2006.01)
*B64C 7/00*    (2006.01)

(52) U.S. Cl.
CPC ...................................... *B64C 7/00* (2013.01)

(58) Field of Classification Search
CPC ... B64C 29/0033; B64C 11/001; B64C 27/20; B64C 27/52; B64C 39/026; B64C 7/00; B64C 9/02; B64C 1/26; B64C 1/12; B64C 3/26; B64C 2025/003
See application file for complete search history.

(56) References Cited

U.S. PATENT DOCUMENTS

| | | | |
|---|---|---|---|
| 5,961,071 A * | 10/1999 | Proctor ..................... | B64C 7/00 244/118.1 |
| 9,434,465 B2 * | 9/2016 | Pelissier ................... | B64C 1/12 |
| 9,669,927 B2 * | 6/2017 | Hodge ..................... | B64D 9/00 |
| 2003/0168554 A1 | 9/2003 | Rouyre et al. | |
| 2004/0124311 A1 * | 7/2004 | Kordel ...................... | B64C 3/26 244/131 |
| 2006/0065784 A1 * | 3/2006 | Rouyre ..................... | B64C 7/00 244/119 |
| 2010/0170987 A1 * | 7/2010 | Meyer ....................... | B64C 1/26 244/120 |
| 2012/0261510 A1 * | 10/2012 | Bogiatzis .................. | B64C 1/26 244/119 |
| 2014/0059860 A1 * | 3/2014 | Hsueh ....................... | B64C 1/26 29/897.2 |
| 2015/0097076 A1 * | 4/2015 | Lakic ........................ | B64C 1/26 244/46 |

* cited by examiner

*Primary Examiner* — Assres H Woldemaryam
(74) *Attorney, Agent, or Firm* — Pearne & Gordon LLP

(57) ABSTRACT

An aircraft comprising a fuselage; a main wing provided on a fuselage lower side and including a center wing and an outer wing; and a fairing covering at least a lower surface of the center wing, and a seal interposed between an end edge in a right-left direction of the fairing and an outer wing lower surface. In the aircraft, a most outboard fitting located on a most outboard side out of fittings respectively provided at a plurality of positions in the right-left direction of the fairing, and an outer wing fitting provided on the outer wing are pin-coupled via a pin or pins extending along a front-rear direction. The outer wing fitting is coupled to the outer wing at a position on an inboard side with respect to the end edge and other than a position of a joining structure for joining the center wing and the outer wing.

10 Claims, 8 Drawing Sheets

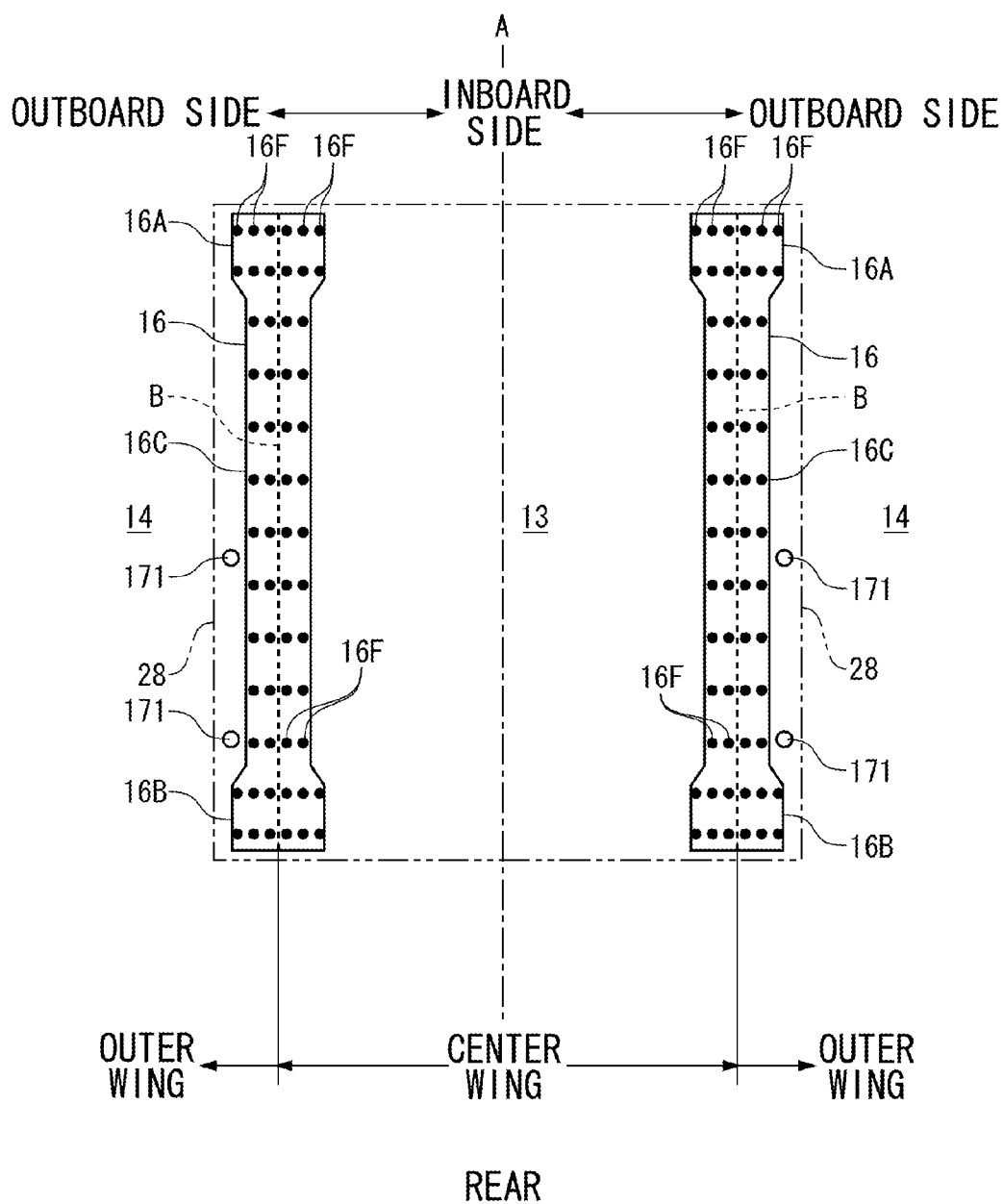

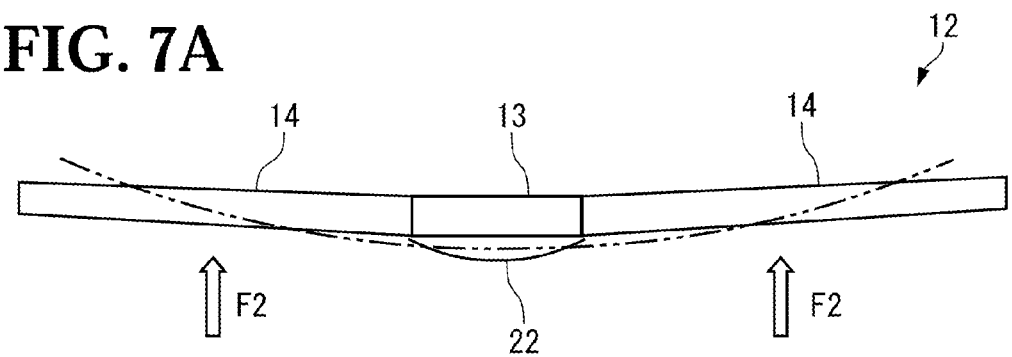
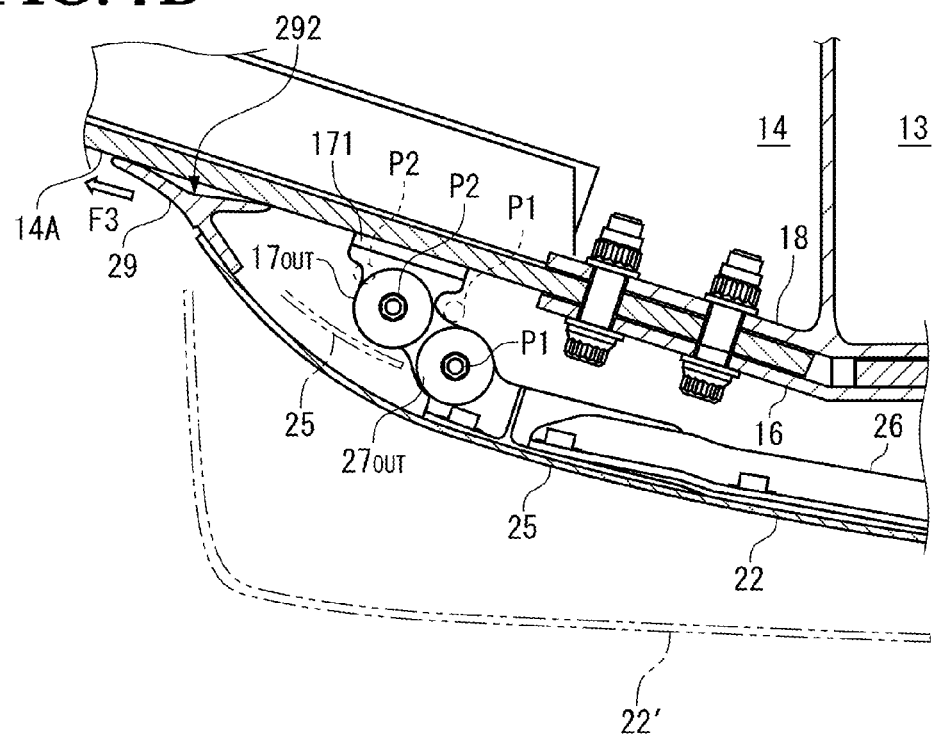

AIRCRAFT INCLUDING SUPPORT FOR A FAIRING

BACKGROUND OF THE INVENTION

Field of the Invention

The present invention relates to an aircraft. More particularly, the present invention relates to a structure for supporting a fairing that covers a lower surface of at least a center portion of a main wing on the main wing on a lower side of a fuselage of the aircraft.

An aerodynamic cover called a belly fairing is provided over a lower portion of a fuselage of aircraft and a lower surface of a center portion of a main wing provided in the fuselage.

The belly fairing (referred to as a fairing below) includes a panel that forms an aerodynamic surface, and a stiffener that reinforces the panel from a back side.

The fairing is supported on the lower portion of the fuselage and the lower surface of the main wing via a plurality of support members (supports).

Regarding the supporting of the fairing on the main wing, a most outboard support member located on a most outboard side in a right-left direction of the fairing is located on an inboard side with respect to an end edge in the right-left direction of the fairing, and is fixed to a structure for joining a center wing and an outer wing of the main wing as described in, for example, U.S. Patent Application Publication No. 2003/0168554.

SUMMARY OF THE INVENTION

In the configuration as in U.S. Patent Application Publication No. 2003/0168554, a load applied to the fairing is input to a load transmission system of a primary structure including the joining structure for joining the center wing and the outer wing. It should be avoided that the load transmission system of the primary structure is thereby influenced.

Also, as shown in FIG. 8, an end edge 1A in a right-left direction of a fairing 1 is located close to a lower surface 2A of a main wing 2, and a seal 3 is interposed between the end edge 1A and the lower surface 2A. The fairing 1 is supported on the main wing 2 in a cantilever manner from a position of a support member 4 located on a most outboard side in the right-left direction to the end edge 1A apart therefrom to the outboard side.

During a flight, a negative pressure at the same level as that on the lower surface side of the main wing relative to a surrounding atmosphere is applied to both end sides in the right-left direction of the fairing. Therefore, a cantilever range 1B of the fairing 1 is warped (see an alternate long and short dash line) upon receiving a load F from an inside to an outside due to a pressure difference between the inside and the outside of the fairing 1, and the end edge 1A of the fairing 1 is separated from the lower surface 2A of the main wing 2, so that a gap is formed between the end edge 1A and the lower surface 2A. Accordingly, an airflow around the end edge 1A is disturbed to increase air resistance, resulting in noise generation by the air resistance.

When stiffness of the fairing 1 is improved by increasing the number of the stiffeners, a deformation amount of the cantilever range 1B is suppressed, and a state in which the end edge 1A is located close to the lower surface 2A of the main wing 2 is thereby effectively maintained; however, a weight of the fairing 1 is increased.

Thus, a first object of the present invention is to mitigate an influence on a load transmission system of a primary structure associated with a main wing of an aircraft regarding supporting of a fairing on the main wing.

Also, a second object of the present invention is to support the fairing on the main wing so as to maintain a state in which an end edge of the fairing is located close to a lower surface of the main wing while avoiding an increase in a weight of the aircraft.

An aircraft of the present invention includes: a fuselage; a main wing that is provided on a lower side of the fuselage; and a fairing that covers a lower surface of at least a center portion of the main wing.

The main wing includes a center wing that is located at the center portion, and an outer wing that is joined to the center wing in a right-left direction of the center wing.

A seal is interposed between an end edge in a right-left direction of the fairing and a lower surface of the outer wing.

The present invention is featured in that a most outboard fitting that is located on a most outboard side out of fittings respectively provided at a plurality of positions in the right-left direction of the fairing, and an outer wing fitting that is provided on the outer wing are pin-coupled via a pin or pins extending along a front-rear direction, and the outer wing fitting is coupled to the outer wing at a position on an inboard side with respect to the end edge and other than a position of a joining structure for joining the center wing and the outer wing.

In the present specification, an upper surface side of the main wing is referred to as an "upper side", and a lower surface side is referred to as a "lower side".

Also, a nose side of the aircraft is referred to as a "front", and a tail side is referred to as a "rear".

Furthermore, a left side of the fuselage is referred to as a "left", a right side of the fuselage a "right", a fuselage side in the right-left direction on each of the right and the left of the fuselage an "inboard side", and an opposite side thereof an "outboard side".

The outer wing fitting in the present invention is coupled to the outer wing at a position other than the position of the joining structure for joining the center wing and the outer wing, and is not coupled to the joining structure. Therefore, an influence on a load transmission system of a primary structure including the joining structure can be mitigated.

Also, the most outboard fitting and the outer wing fitting are pin-coupled. In this case, when the main wing is deformed by lift and the lower surface side of the main wing is displaced so as to be pulled to the outboard side, the outer wing fitting and the most outboard fitting relatively rotate about an axis of the pin following the displacement, and the main wing and the fairing are thereby relatively displaced within a plane perpendicular to the pin. Therefore, an excessive stress is not generated on the main wing and the fairing.

In the aircraft of the present invention, the pin that is provided at least at the most outboard fitting is preferably located on the inboard side with respect to the end edge and on the outboard side with respect to the joining structure.

Accordingly, the most outboard fitting is coupled to the outer wing fitting via the pin located on the outboard side with respect to the joining structure. Since a position of the pin becomes a most outboard support position of the fairing, a length of a cantilever range from the most outboard support position of the fairing to the end edge of the fairing is smaller than that in a conventional example in which the most outboard support position of the fairing exists at the position of the joining structure or on the inboard side therefrom. Therefore, the fairing is difficult to warp by an aerodynamic load caused by a pressure difference between an inside and an outside of the fairing, and a state in which the end edge of the fairing is located close to the lower surface of the outer wing can be thereby maintained. Accordingly, a state in which a space between the end edge of the fairing and the lower surface of the outer wing is closed by the seal can be maintained, so that an increase in air resistance due to the gap and noise generation by the air resistance can be avoided.

In the aircraft of the present invention, the most outboard fitting and the outer wing fitting are preferably pin-coupled via a link.

Accordingly, as compared to a case in which the most outboard fitting and the outer wing fitting are directly pin-coupled without interposing the link, a degree of positional freedom within the plane perpendicular to the pin of the main wing and the fairing is increased, so that the fairing can be more sufficiently caused to follow the deformation of the main wing.

In the aircraft of the present invention, the outer wing fitting is preferably located on the outboard side with respect to the most outboard fitting.

Accordingly, as compared to a case in which the outer wing fitting and the most outboard fitting are arranged vertically side by side at the same position in the right-left direction, the outer wing fitting and the most outboard fitting can be arranged in a vertically smaller space, so that the respective fittings and the link can be fitted within a space between the fairing and the outer wing even when the space is small.

Therefore, the present invention can be preferably applied to a fairing that is formed thin in order to reduce air resistance.

In accordance with the present invention, the influence on the load transmission system of the primary structure associated with the main wing of the aircraft regarding the supporting of the fairing on the main wing can be mitigated.

Also, in accordance with the present invention, it is possible to suppress a deformation amount of the cantilever range of the fairing without increasing the number of stiffeners or the like in order to increase stiffness of the fairing, so that the state in which the end edge of the fairing is located close to the lower surface of the main wing can be maintained while avoiding an increase in a weight of the aircraft.

Moreover, the fairing can be caused to follow the deformation of the main wing by pin-coupling the most outboard fitting and the outer wing fitting, so that application of an excessive stress to the main wing and the fairing can be avoided.

BRIEF DESCRIPTION OF THE DRAWINGS

FIG. 6 is a schematic view illustrating a center fairing and a splice plate that joins a center wing and an outer wing.

FIG. 7A is a schematic view illustrating deformation of a main wing; and FIG.

FIG. 7B is a view illustrating a state in which the fairing follows the deformation of the main wing.

DETAILED DESCRIPTION OF THE PREFERRED EMBODIMENT

In the following, an aircraft according to an embodiment of the present invention will be described with reference to the accompanying drawings.

Figure 1:
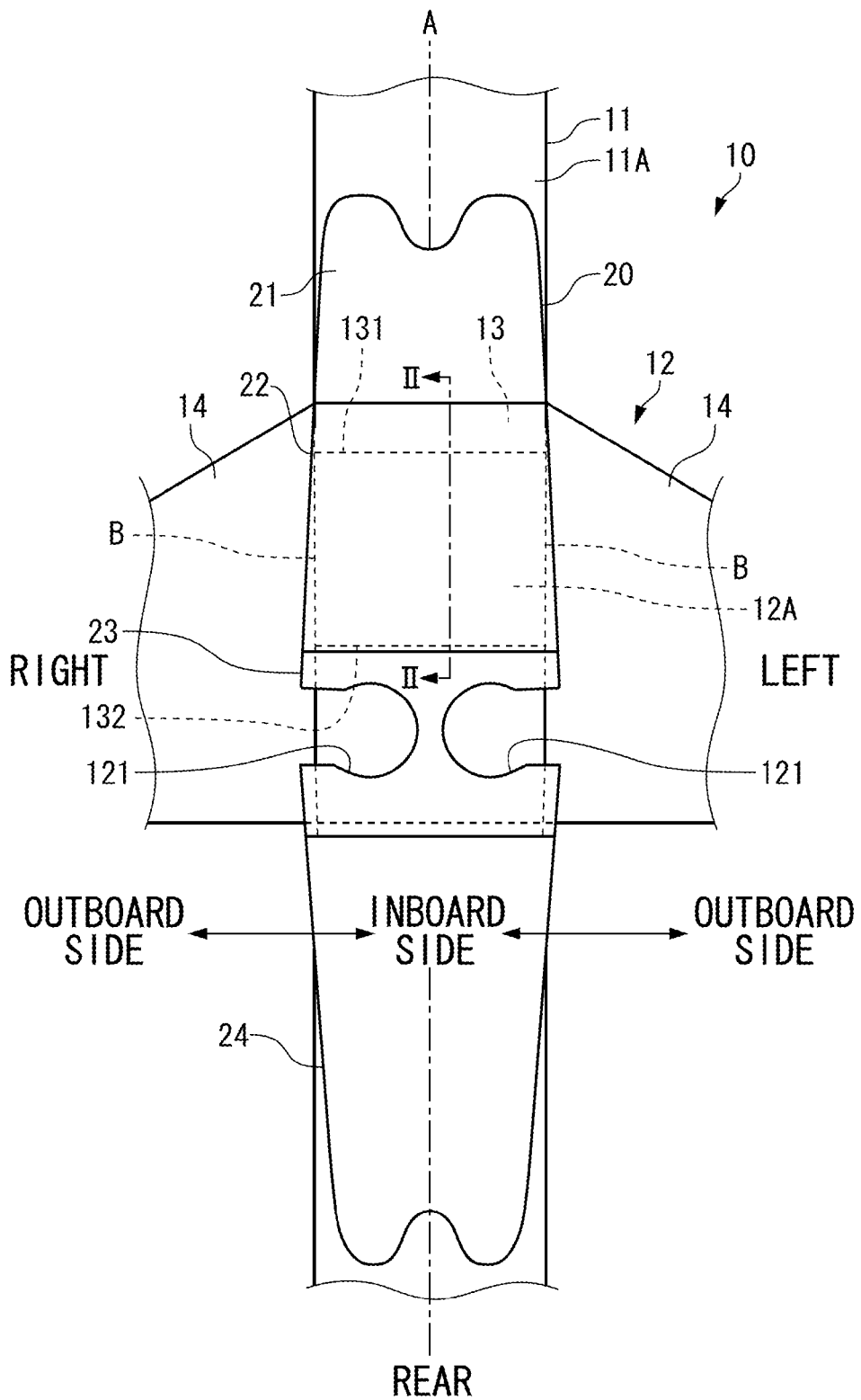
FIG. 1 is a plan view illustrating a belly fairing that is provided on a lower side of an aircraft according to an embodiment of the present invention.

An aircraft 10 shown in FIG. 1 includes a fuselage 11, a main wing 12 that is provided on a lower side of the fuselage 11, and a belly fairing 20 that is provided over a lower surface 12A of the main wing 12 and a lower portion 11A of the fuselage 11.

Although not specifically shown in the drawings, the main wing 12 has a box structure including a plurality of ribs that are arranged at intervals in a length direction of the main wing 12, spars that are arranged at a front and a rear of the main wing 12 and connect the plurality of ribs, and skins that are arranged on an upper side and a lower side of the main wing 12 and supported by the ribs and the spars. A plurality of stringers are provided along the length direction of the main wing 12 on a back side of each of the upper-side skin and the lower-side skin. Fuel is stored in an inner portion of the main wing 12.

Figure 2:
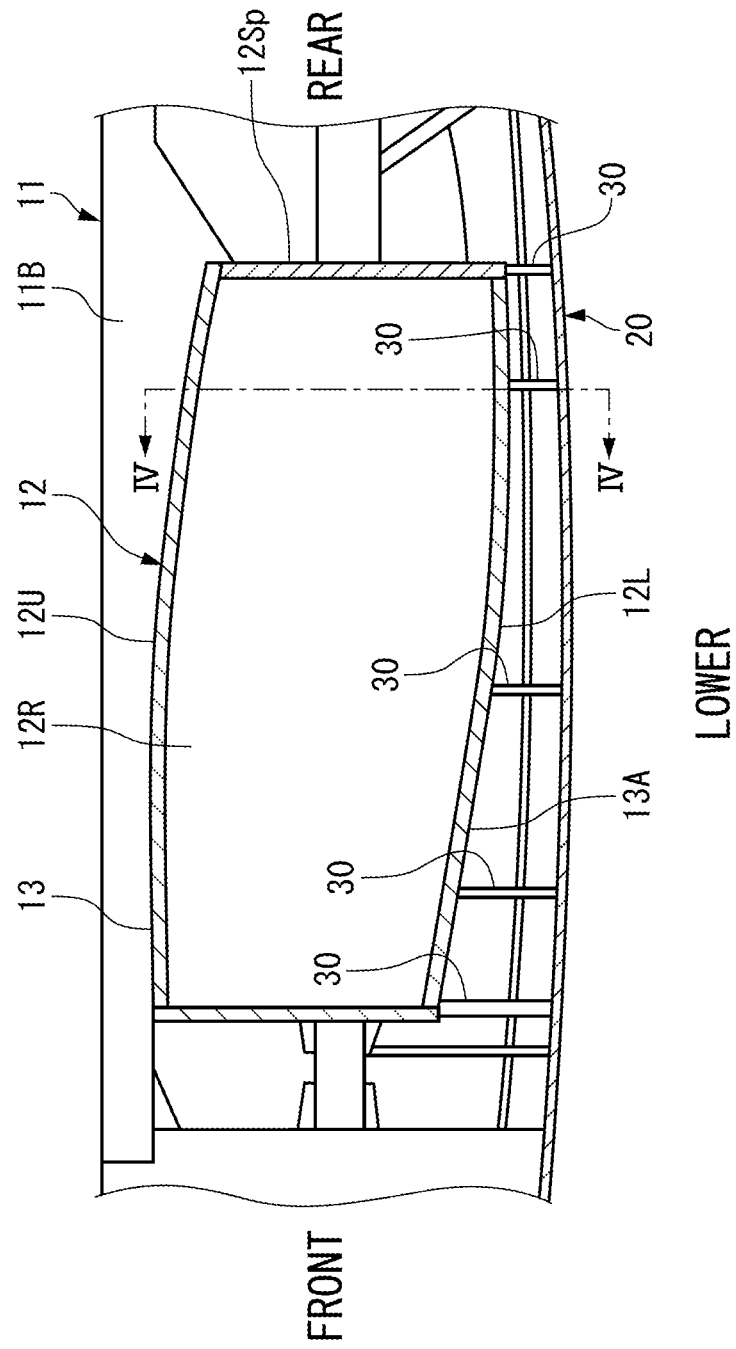
FIG. 2 is a sectional view on an arrow II-II in FIG. 1.
Figure 4:
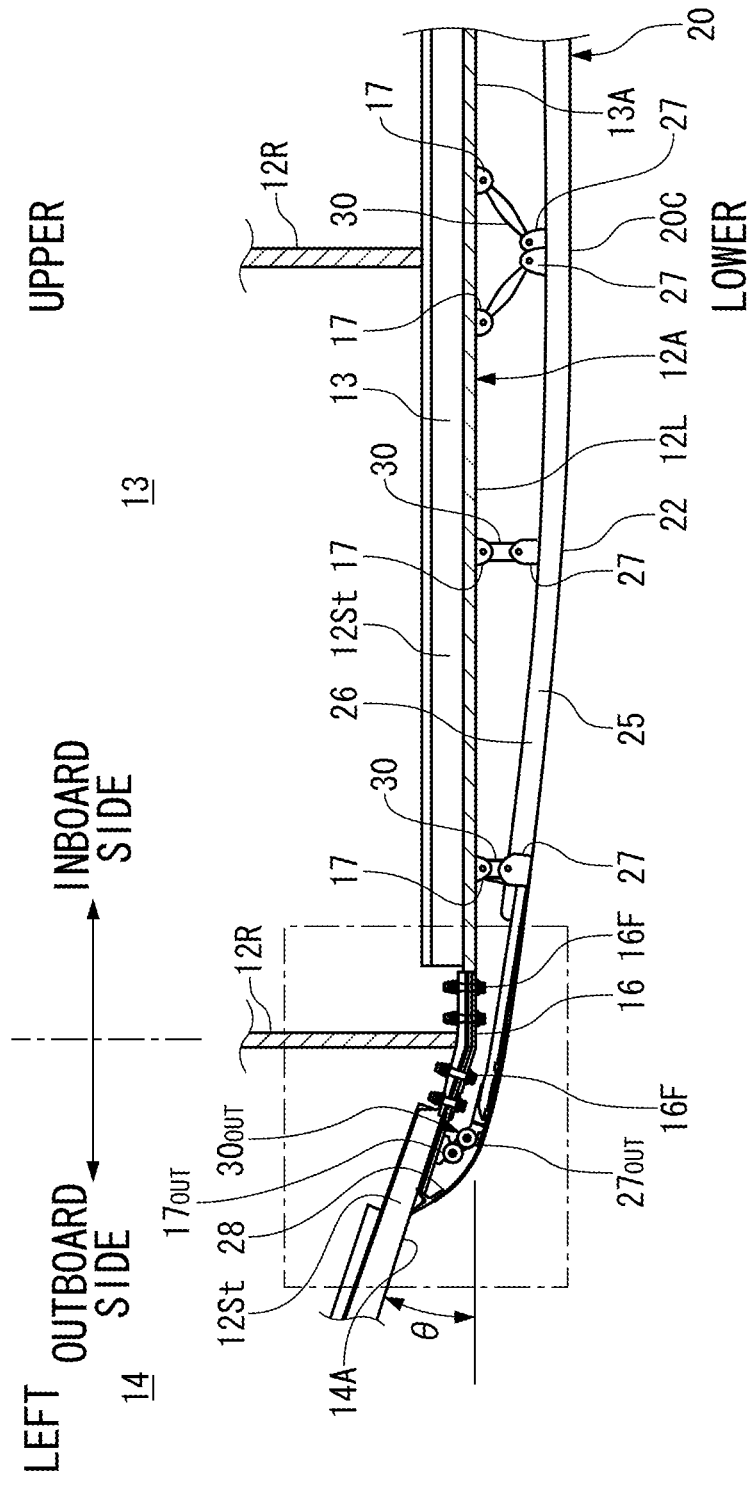
FIG. 4 is a sectional view on an arrow IV-IV in FIG. 2.

FIG. 2 shows a rib 12R, an upper-side skin 12U, a lower-side skin 12L, and a rear-side spar 12Sp. Also, FIG. 4 shows the ribs 12R, the lower-side skin 12L, and a stringer 12St.

The main wing 12 is divided into a center wing 13 that is located at a center portion in a right-left direction of the main wing 12, and outer wings 14 and 14 that are located on both right and left sides of the center wing 13 as shown in FIG. 1. The ribs are arranged at borders B between the center wing 13 and the outer wings 14 and 14.

The center wing 13 is joined to a structural member 11B of the fuselage 11 as shown in FIG. 2. A lower surface 13A of the center wing 13 is covered with the belly fairing 20.

Figure 5:
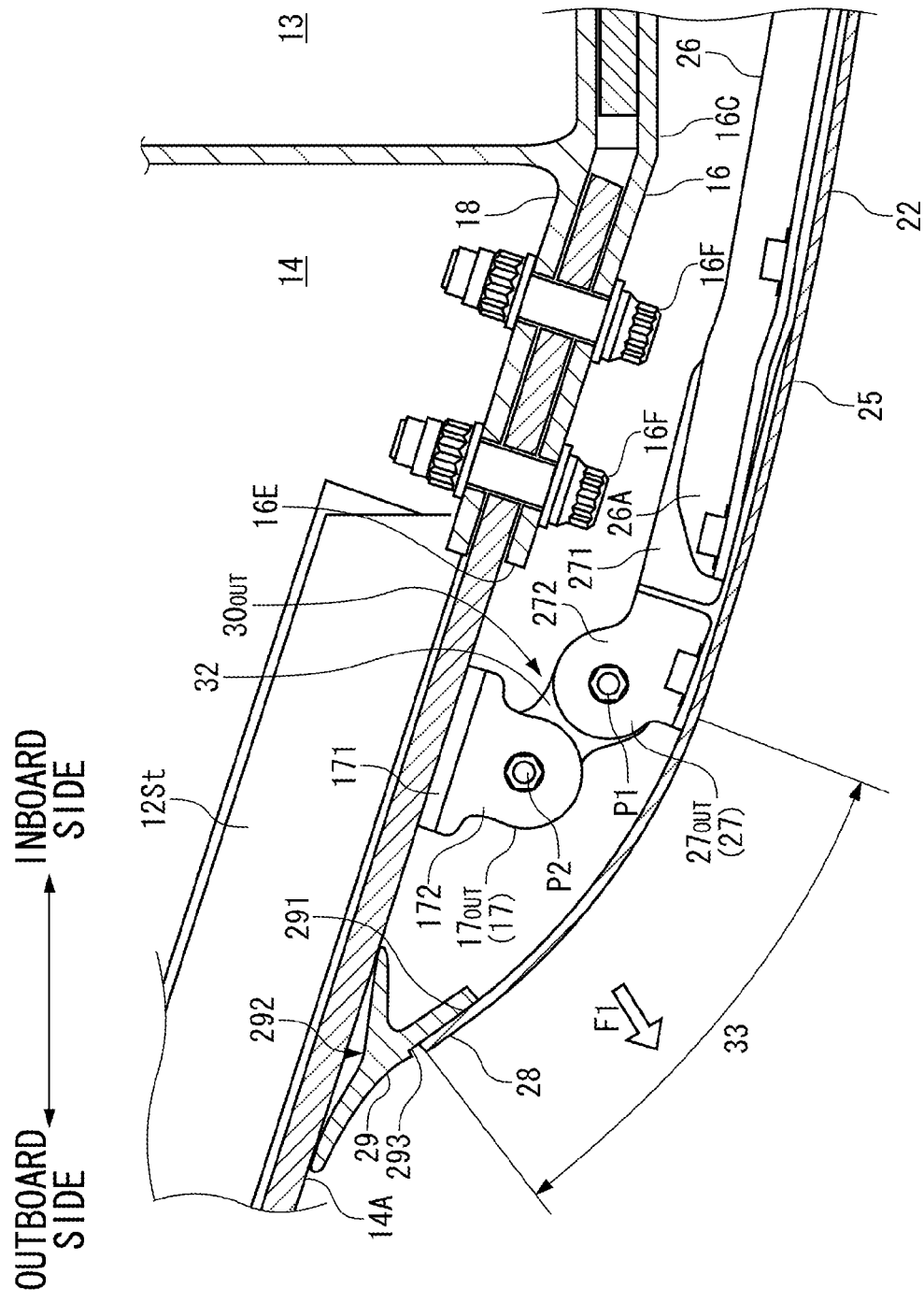
FIG. 5 is an enlarged view of a main portion in FIG. 4.
Figure 8:
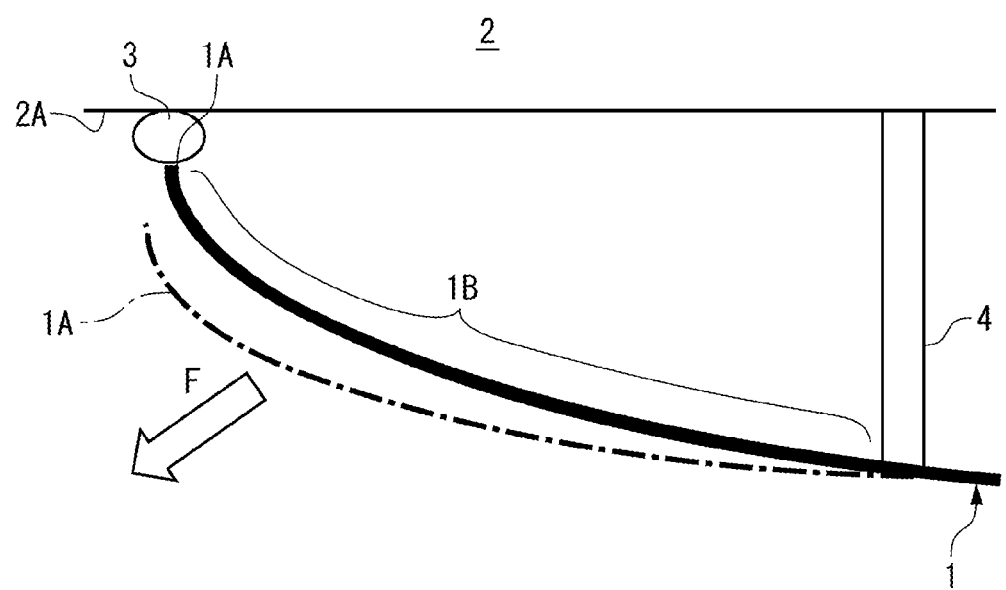
FIG. 8 is a schematic view illustrating a belly fairing and a lower surface of a main wing according to a conventional example.

Each of the right and left outer wings 14 and 14 (FIG. 1) is joined to the center wing 13 via a splice plate 16 (FIG. 6). The splice plate 16 is arranged on a lower side of the lower-side skin 12L along the border B between the center wing 13 and the outer wing 14 (FIG. 5). The splice plate 16 and a chord 18 that is arranged on an upper side of the lower-side skin 12L are integrated with the center wing 13 and the outer wing 14 by a plurality of fasteners 16F that penetrate in a thickness direction.

The splice plate 16 is a primary structural member that transmits a large load applied to the main wing 12 during a flight, and has a shape in which a front end side 16A and a rear end side 16B are wider than a center portion 16C as shown in FIG. 6 in order to dispersedly transmit the load.

A predetermined dihedral angle θ is given to the outer wings 14 and 14 (FIG. 4).

The belly fairing 20 extends from a position ahead of the center wing 13 up to a position behind the center wing 13 as shown in FIG. 1. The belly fairing 20 improves aerodynamic performance of the aircraft 10 by covering and aerodynamically shaping uneven portions formed between a front end 131 of the center wing 13 and the fuselage 11, between a rear end 132 of the center wing 13 and the fuselage 11, in joined portions (the splice plates 16) between the center wing 13 and the outer wings 14 and 14, or the like.

Figure 3:
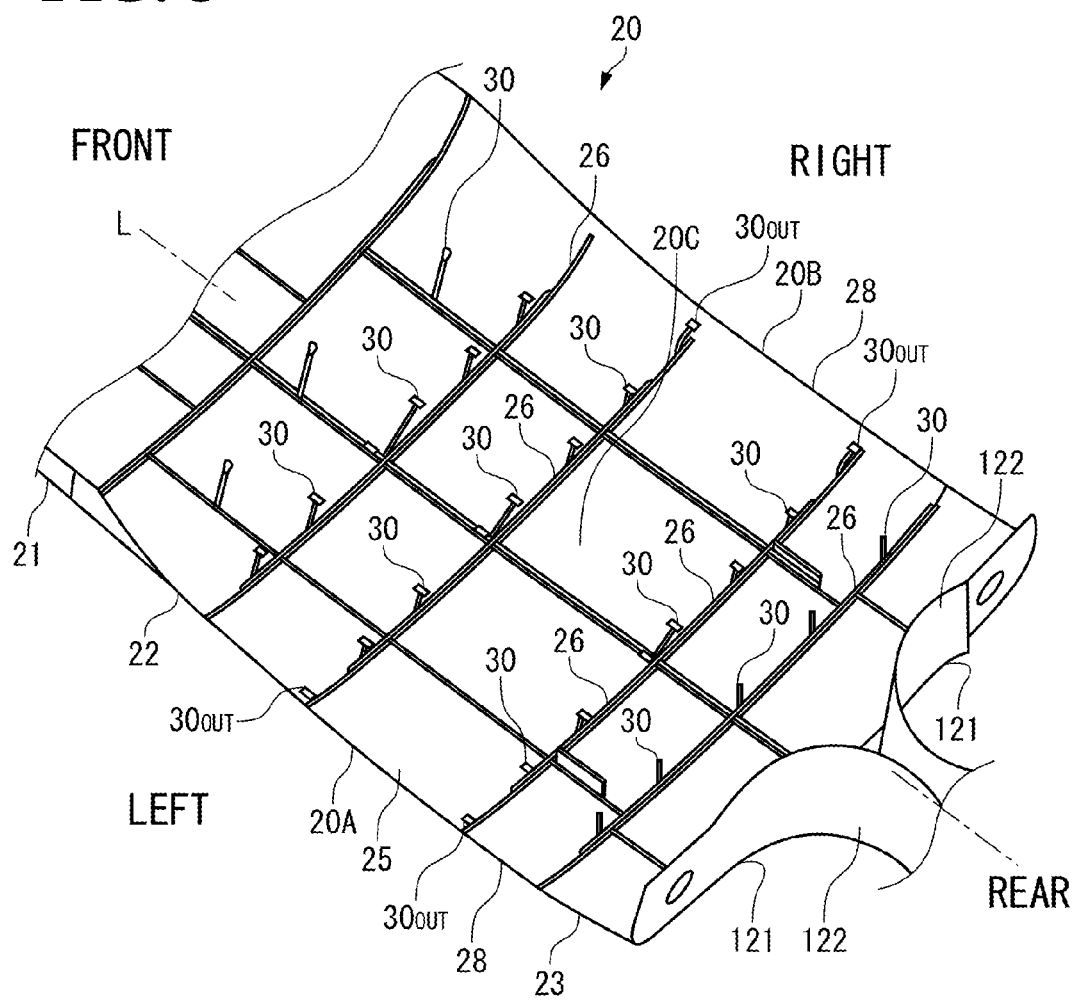
FIG. 3 is a perspective view illustrating a portion of the belly fairing in FIG. 1 from a back side.

The belly fairing 20 is slightly curved in a direction in which a center portion 20C in the right-left direction is convex to the lower side with respect to both end portions 20A and 20B in the right-left direction as shown in FIGS. 3 and 4. An unillustrated main landing gear bay and various accessories are arranged between the belly fairing 20 and the center wing 13 and between the belly fairing 20 and the fuselage 11.

The belly fairing 20 is provided with an opening 121 through which the main landing gear is extended and retracted, a case 122 that accommodates a wheel of the main landing gear (FIG. 3), an unillustrated access panel that is attached and detached for maintenance of the accessories arranged on an inner side of the belly fairing 20, or the like.

The belly fairing 20 is composed of a front fairing 21 that is located ahead of the center wing 13, a center fairing 22 that is located below the center wing 13, a main landing gear fairing 23 that is located behind the center fairing 22, and in which the main landing gear bay is arranged, and a rear fairing 24 that is located behind the main landing gear fairing 23 as shown in FIG. 1.

The belly fairing 20 is not limited to the respective regions (21 to 24) in the present embodiment, and can be appropriately divided. Also, the respective regions (21 to 24) can be divided into smaller regions.

The fairings 21 to 24 are suspended from the lower surface 12A of the main wing 12 (the lower surface 13A of the center wing 13 and a lower surface 14A of the outer wing 14) or the lower portion 11A of the fuselage 11 (FIG. 1) via a plurality of support members 30 shown in FIG. 3 (see also FIG. 2).

In the following, the center fairing 22 corresponding to the center wing 13 is described by reference to FIGS. 3 to 7.

The center fairing 22 (referred to as a fairing 22 below) includes a panel 25 that forms an aerodynamic surface, and a plurality of stiffeners 26 that reinforce the panel 25 from a back side as shown in FIGS. 3 and 4.

The panel 25 is formed bilaterally symmetrical with respect to a center line L corresponding to an airframe axis A (FIG. 1) set in the fuselage 11 as shown in FIG. 3.

The panel 25 is formed in a substantially rectangular shape in plan view from a metal material such as aluminum alloy, or a fiber reinforced resin containing carbon fibers, glass fibers, etc.

The entire panel 25 from the center portion 20C that is a center portion in the right-left direction up to end edges 28 and 28 in the right-left direction is gently curved with a large radius of curvature toward the lower surfaces 14A of the outer wings 14 as shown in FIGS. 3 and 4. Therefore, a height (a vertical dimension) of the panel 25 even at the center portion 20C that is farthest from the lower surface 13A of the center wing 13 is kept small, and a thickness of the entire panel 25 is small. Accordingly, a sectional area of the entire aircraft 10 including the fairing 22 can be decreased, and air resistance can be thereby reduced.

Each of the plurality of stiffeners 26 extends throughout an entire width in the right-left direction of the panel 25, or substantially the entire width of the panel 25 except for the vicinities of the end edges 28 as shown in FIG. 3, and is fixed to a back surface side of the panel 25 by a fastener. The stiffeners 26 are arranged so as not to interfere with the access panel.

Each of the stiffeners 26 is supported by the center wing 13 via the support members 30 at a plurality of positions in the right-left direction.

Positions, the number, a material, or the like of the stiffeners 26 are determined such that necessary stiffness can be given to the panel 25 by the stiffeners 26, and the fairing 22 can be surely supported on the center wing 13 via the support members 30.

The support members 30 are supported on the stringer 12St provided on the back side of the lower-side skin 12L of the center wing 13 as shown in FIG. 4. The stiffener 26 is arranged at a position corresponding to the stringer 12St.

Each of the support members 30 provided on the fairing 22 is pin-coupled to a fitting 27 provided on the stiffener 26 and a main wing fitting 17 provided on the stringer 12St of the main wing 12 as shown in FIG. 4.

The present embodiment has a main feature in a position of the support member 30 that is located on a most outboard side in the right-left direction of the fairing 22, and a form of the support member 30. In the following, the support member 30 that is located on the most outboard side in the right-left direction of the fairing 22 is referred to as a most outboard support member $30_{OUT}$.

First, a configuration around the end edge 28 in the right-left direction of the fairing 22 is described by reference to FIGS. 5 and 6, and the most outboard support member $30_{OUT}$ is thereafter described.

The end edge 28 of the fairing 22 is continuous substantially along a front-rear direction as shown in FIG. 6.

As shown in FIG. 5, an end portion 26A of the stiffener 26 where the most outboard support member $30_{OUT}$ is provided is retracted to an inboard side from the end edge 28 of the fairing 22. That is, the stiffener 26 is not provided in a range from the end edge 28 of the fairing 22 to a predetermined position on the inboard side, and the end edge 28 of the fairing 22 corresponds to an end edge in the right-left direction of the panel 25.

The end edge 28 is located on the outboard side with respect to the splice plate 16 that joins the center wing 13 and the outer wing 14 as shown in FIGS. 5 and 6. In other words, the entire splice plate 16 is covered with the fairing 22.

The end edge 28 is located close to the lower surface 14A of the outer wing 14, and a seal 29 is interposed between the end edge 28 and the lower surface 14A as shown in FIG. 5. The seal 29 is made of an elastic material such as silicone rubber, and is pressed against the lower surface 14A.

The seal 29 has a fixed portion 291 that is fixed to a back side of the end edge 28, and a sealing portion 292 that closes a space between the end edge 28 and the lower surface 14A. The sealing portion 292 is formed in a V shape in section. A step portion 293 is formed between the fixed portion 291 and the sealing portion 292. The sealing portion 292 is swingably deformable with respect to the fixed portion 291.

The most outboard support member $30_{OUT}$ located on the most outboard side of the fairing 22 is provided at both right and left ends of the stiffener 26 at positions on the inboard side with respect to the end edges 28 as shown in FIG. 3. In the present embodiment, a total of four most outboard support members $30_{OUT}$ are provided on two stiffeners 26. The number of the most outboard support members $30_{OUT}$ can be appropriately determined according to a size, a weight, or the like of the fairing 22.

As shown in FIG. 5, the most outboard support member $30_{OUT}$ includes the fitting 27 that is fixed to the stiffener 26, the main wing fitting 17 that is fixed to the stringer 12St on a back side of the lower surface 14A of the outer wing 14, and a link 32 that connects the fittings 27 and 17.

In the following, the fitting 27 provided in the most outboard support member $30_{OUT}$ is referred to as a most outboard fitting $27_{OUT}$, and the main wing fitting 17 provided in the most outboard support member $30_{OUT}$ is referred to as an outer wing fitting $17_{OUT}$.

The most outboard fitting $27_{OUT}$ is coupled to the link 32 by a pin P1. The outer wing fitting $17_{OUT}$ is coupled to the link 32 by a pin P2. Both of the pins P1 and P2 extend along the front-rear direction. The most outboard fitting $27_{OUT}$ and the outer wing fitting $17_{OUT}$ coupled by the pins P1 and P2 via the link 32 are relatively rotatable about axes of the pins P1 and P2.

The outer wing fitting $17_{OUT}$ has a fixed portion 171 that is coupled to the stringer 12St via the lower-side skin of the outer wing 14, and a pin coupling portion 172 that is continuous to the fixed portion 171 and where the pin P2 is provided.

The most outboard fitting $27_{OUT}$ has a fixed portion 271 that extends toward the outboard side along the panel 25 from the end portion 26A of the stiffener 26 located below the splice plate 16, and a pin coupling portion 272 that is continuous to the outboard side of the fixed portion 271 and where the pin P1 is provided.

The fairing 22 can be considered to be supported in a cantilever manner from a position of the pin P1 of the pin coupling portion 272 to the end edge 28. In the following, a range from the position of the pin P1 to the end edge 28 is referred to as a cantilever range 33.

The most outboard support member $30_{OUT}$ supports the fairing 22 on the outboard side with respect to the center portion 16C in a length direction of the splice plate 16.

The fixed portion 171 of the outer wing fitting $17_{OUT}$ is not located at the splice plate 16, but is at a position other than the splice plate 16. The fixed portion 171 is coupled to the outer wing 14 on the outboard side with respect to an end edge 16E of the center portion 16C of the splice plate 16. In FIG. 6, the position of the fixed portion 171 is indicated by a white circle.

Also, in the present embodiment, the pin P1 provided at the pin coupling portion 272 of the most outboard fitting $27_{OUT}$ is preferably located on the outboard side with respect to the end edge 16E of the center portion 16C of the splice plate 16. Here, the position of the pin P1 only needs to be on the outboard side with respect to the center portion 16C located around the pin P1, and does not need to be on the outboard side with respect to the front end side 16A and the rear end side 16B of the splice plate 16.

Moreover, in the present embodiment, the outer wing fitting $17_{OUT}$ is preferably located on the outboard side with respect to the pin coupling portion 272 of the most outboard fitting $27_{OUT}$.

A position and a form of each of the outer wing fitting $17_{OUT}$ and the most outboard fitting $27_{OUT}$ described above are determined so as to mitigate an influence on a primary structure including the splice plate 16, and to maintain a state in which the end edge 28 of the fairing 22 is located close to the lower surface 14A of the outer wing 14 and avoid application of an excessive stress to the main wing 12 and the fairing 22 even when the main wing 12 is deformed by an aerodynamic load.

As described above, the outer wing fitting $17_{OUT}$ is coupled to the outer wing 14, and is not coupled to the splice plate 16 that joins the center wing 13 and the outer wing 14. Therefore, when the fairing 22 is supported on the main wing, the influence on a load transmission system of the primary structure including the splice plate 16 can be mitigated.

Moreover, in the present embodiment, since the position of the pin P1 provided at the pin coupling portion 272 of the most outboard fitting $27_{OUT}$ is set on the outboard side with respect to the splice plate 16, the cantilever range 33 can be made small (FIG. 5).

Accordingly, a length of the cantilever range 33 is smaller than that in a conventional example in which the fairing 22 is supported at a position of the splice plate 16 or on the inboard side therefrom, so that the fairing 22 is difficult to warp upon receiving an aerodynamic load, and a deformation amount is small even when the fairing 22 is warped.

The aerodynamic load here means a load F1 from an inside to an outside of the fairing 22 based on a pressure difference between the inside and the outside of the fairing 22 on both end sides in the right-left direction of the fairing 22 to which a negative pressure at the same level as that on the lower surface 14A sides of the outer wings 14 and 14 relative to a surrounding atmosphere is applied during a flight.

In the present embodiment, since the outer wing fitting $17_{OUT}$ is coupled to the outer wing on the outboard side with respect to the end edge 16E of the center portion 16C of the splice plate 16, the cantilever range 33 to the end edge 28 from the position of the pin P1 of the pin coupling portion 272 of the most outboard fitting $27_{OUT}$ coupled thereto via the link 32 can be also made small (FIG. 5).

When the deformation amount of the fairing 22 is small because of the small cantilever range 33, the state in which the end edge 28 of the fairing 22 is located close to the lower surface 14A of the outer wing 14 as shown in FIG. 5 can be maintained. At this time, a state in which the seal 29 is pressed against the lower surface 14A by an elastic force of the seal 29 can be maintained. Therefore, no gap is formed between the end edge 28 and the lower surface 14A, and it is possible to avoid an increase in air resistance due to the gap and noise generation by the air resistance.

In accordance with the present embodiment, it is possible to suppress the deformation amount of the cantilever range 33 of the fairing 22 without increasing the number of stiffeners 26 or the like in order to increase stiffness of the fairing 22, so that an increase in a weight of the aircraft 10 can be avoided.

Next, regarding a form of the most outboard support member $30_{OUT}$, the outer wing fitting $17_{OUT}$ provided on the main wing 12 and the most outboard fitting $27_{OUT}$ provided on the fairing 22 are pin-coupled in the present embodiment.

The main wing 12 is deformed so as to be convex downward (see an alternate long and two short dashes line) upon mainly receiving an aerodynamic load by a lift F2 acting on the outer wings 14 and 14 as shown in FIG. 7A. At this time, the fairing 22 is also deformed following displacement of the main wing 12. Here, a load F3 is applied in a direction in which the lower surface 12A-side of the main wing 12 is pulled to the outboard side and the upper side as shown in FIG. 7B.

When the outer wing fitting $17_{OUT}$ is displaced in a direction of F3 indicated by an arrow by the load F3, the outer wing fitting $17_{OUT}$, the link 32, and the most outboard fitting $27_{OUT}$ relatively rotate about the axes of the pins P1 and P2 following the displacement, so that the main wing 12 and the fairing 22 are relatively displaced within a plane perpendicular to the pins P1 and P2. At this time, the link 32 rotates counterclockwise in the drawing, and the fairing 22 and the outer wing 14 approach each other. The pins P1 and P2 and a portion of the panel 25 after the displacement are indicated by alternate long and two short dashes lines, respectively.

In accordance with the above configuration, the fairing 22 and the main wing 12 have a degree of freedom of rotation about the pins P1 and P2 via the outer wing fitting $17_{OUT}$, the link 32, and the most outboard fitting $27_{OUT}$, so that the fairing 22 can be sufficiently displaced following the displacement of the main wing 12. Therefore, damage to the main wing 12 and the fairing 22 can be avoided without generating an excessive stress thereon.

Also, when the fairing 22 and the outer wing 14 approach each other following the displacement of the main wing 12, the sealing portion 292 of the seal 29 swings to the outboard side, and is maintained in a state in contact with the lower surface 14A, so that the space between the end edge 28 of the fairing 22 and the lower surface 14A of the main wing 12 can be sufficiently closed without buckling the sealing portion 292.

The fairing 22 of the present embodiment is of a thin type, and a length measured along a curved surface from one end to the other end in the right-left direction is smaller than a length of a fairing 22' of a thick type with a large vertical dimension as indicated by an alternate long and two short dashes line in FIG. 7B. Therefore, a stress proportionally divided in the length direction is larger than that of the fairing 22'. Also, since the fairing 22' is bent upward on both end sides in the right-left direction, end portions of the fairing 22' are deformed so as to open to the outboard side following the displacement of the main wing 12, and can thereby absorb relative displacement of the main wing 12 and the fairing 22. In contrast, since the fairing 22 of the present embodiment extends in a direction substantially along the lower surface 14A of the outer wing 14, the relative displacement cannot be expected to be absorbed by the deformation of the fairing 22.

However, when the outer wing fitting $17_{OUT}$ and the most outboard fitting $27_{OUT}$ are pin-coupled via the link 32 as in the present embodiment, the fairing 22 can be sufficiently caused to follow the deformation of the main wing 12. That is, when the outer wing fitting $17_{OUT}$ and the most outboard fitting $27_{OUT}$ are pin-coupled via the link 32, a great effect is obtained particularly in forming the fairing 22 to be thin.

Also, since the splice plate 16 is covered by the fairing 22 of the present embodiment, air resistance is not increased even if head portions of the fasteners 16F provided at the splice plate 16 are not formed in a dish shape.

In the above embodiment, the outer wing fitting $17_{OUT}$ is arranged on the outboard side with respect to the most outboard fitting $27_{OUT}$ such that the fittings $17_{OUT}$ and $27_{OUT}$ are fitted within a small space between the fairing 22 and the outer wing 14 without interfering with each other. The most outboard fitting $27_{OUT}$ and the outer wing fitting $17_{OUT}$ are arranged vertically close to each other to a degree not interfering with each other. At this time, the link 32 connecting the pin P1 provided at the most outboard fitting $27_{OUT}$ and the pin P2 provided at the outer wing fitting $17_{OUT}$ is inclined with respect to the lower surface 14A of the outer wing 14.

On the other hand, the outer wing fitting $17_{OUT}$ and the most outboard fitting $27_{OUT}$ can be arranged vertically side by side at the same position in the right-left direction depending on the space between the fairing 22 and the outer wing 14, and sizes of the fittings $17_{OUT}$ and $27_{OUT}$. At this time, the link 32 is substantially perpendicular to the lower surface 14A of the outer wing 14. In this case, a movable range of the link 32 along with the displacement of the main wing 12 is larger than a movable range of the link 32 in the above embodiment. Therefore, the fairing 22 can be sufficiently caused to follow larger displacement of the main wing 12.

Furthermore, a configuration may be employed in which the pin coupling portion 272 of the most outboard fitting $27_{OUT}$ is located on the outboard side with respect to the outer wing fitting $17_{OUT}$. In this case, the movable range of the link 32 along with the displacement of the main wing 12 is also larger than the movable range of the link 32 in the above embodiment, so that the fairing 22 can be sufficiently caused to follow larger displacement of the main wing 12.

The constitutions described in the aforementioned embodiment may be freely selected or appropriately changed into other constitutions without departing from the scope of the present invention.

For example, the pin P1 provided at the most outboard fitting $27_{OUT}$ may not be at the position exceeding the end edge 16E of the center portion 16C of the splice plate 16 to the outboard side, but may be located immediately below the center portion 16C of the splice plate 16. Even in this case, as long as the outer wing fitting $17_{OUT}$ is coupled to the outer wing 14 at a position other than the splice plate 16, the object of mitigating the influence on the load transmission system of the primary structure including the splice plate 16 can be achieved.

The present invention allows that the outer wing fitting $17_{OUT}$ and the most outboard fitting $27_{OUT}$ are directly coupled by the single pin P1 without interposing the link 32. Even in this case, with the fittings $17_{OUT}$ and $27_{OUT}$ relatively rotating, the fairing 22 can be caused to follow the displacement of the main wing 12.

Also, the structure for joining the center wing 13 and the outer wing 14 is not limited to the splice plate 16, and any form may be employed.

What is claimed is:

1. An aircraft comprising:
    a fuselage;
    a main wing that is provided on a lower side of the fuselage; and
    a fairing that covers a lower surface of at least a center portion of the main wing,
    the main wing including
    a center wing that is located at the center portion, and
    an outer wing that is joined to the center wing in a right-left direction of the center wing, and
    a seal being interposed between an end edge in a right-left direction of the fairing and a lower surface of the outer wing,
    wherein a most outboard fitting that is located on a most outboard side of a plurality of fittings provided at a plurality of positions in the right-left direction of the fairing, and an outer wing fitting that is provided on the outer wing are pin-coupled via a pin or pins extending along a front-rear direction, and
    the outer wing fitting is coupled to the outer wing at a position on an inboard side with respect to the end edge and other than a position of a joining structure for joining the center wing and the outer wing.

2. The aircraft according to claim 1, wherein the pin or pins that are provided at least at the most outboard fitting are located on the inboard side with respect to the end edge and on the outboard side with respect to the joining structure.

3. The aircraft according to claim 1,
    wherein the most outboard fitting and the outer wing fitting are pin-coupled via a link.

4. The aircraft according to claim 2,
    wherein the most outboard fitting and the outer wing fitting are pin-coupled via a link.

5. The aircraft according to claim 3,
wherein the outer wing fitting is located on the outboard side with respect to the most outboard fitting.

6. The aircraft according to claim 4,
wherein the outer wing fitting is located on the outboard side with respect to the most outboard fitting.

7. The aircraft according to claim 1,
wherein a splice plate constitutes the joining structure.

8. The aircraft according to claim 1,
wherein the seal is made of an elastic material,
the seal comprises a fixed portion that is fixed to a back side of the end edge, and a sealing portion that closes a space between the end edge and the lower surface of the outer wing, and
the sealing portion is swingably deformable with respect to the fixed portion.

9. The aircraft according to claim 1,
wherein the most outboard fitting comprises:
a first fixed portion that extends from an end portion of a stiffener that is located below the joining structure toward an outboard side along a panel constituting the fairing, and
a first pin coupling portion that is continuous to an end portion of the first fixed portion and where a first pin is provided.

10. The aircraft according to claim 1,
wherein the outer wing fitting comprises:
a second fixed portion that is coupled to a stringer via a lower-side skin of the outer wing, and
a second pin coupling portion that is continuous to the second fixed portion and where a second pin is provided.

\* \* \* \* \*